United States Patent
Lopes et al.

(10) Patent No.: US 8,527,498 B1
(45) Date of Patent: Sep. 3, 2013

(54) METHOD AND SYSTEM FOR ORGANIZING VALUES OF ALTERNATIVE EQUALITY CONDITIONS

(75) Inventors: Arthur Vargas Lopes, San Diego, CA (US); Chi-ping Bess Cheong, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 2591 days.

(21) Appl. No.: 10/783,334

(22) Filed: Feb. 20, 2004

(51) Int. Cl.
*G06F 7/00* (2006.01)

(52) U.S. Cl.
USPC .......................................................... 707/713

(58) Field of Classification Search
USPC .......................................................... 707/713
See application file for complete search history.

(56) References Cited

U.S. PATENT DOCUMENTS

| | | | | |
|---|---|---|---|---|
| 6,134,543 | A | * | 10/2000 | Witkowski et al. ............... 707/2 |
| 6,298,342 | B1 | * | 10/2001 | Graefe et al. ..................... 707/4 |
| 6,662,175 | B1 | * | 12/2003 | Ghazal et al. .................... 707/2 |
| 2002/0059281 | A1 | * | 5/2002 | Watanabe et al. ............. 707/100 |

* cited by examiner

*Primary Examiner* — Belix M Ortiz Ditren
(74) *Attorney, Agent, or Firm* — Howard Speight

(57) ABSTRACT

A method, computer program, and computer network are disclosed for organizing values of multiple alternative equality conditions between a database column and a set of values. The method includes applying a function to each value to obtain a result for each value. The values are organized into groups where each group includes values with the same result. The values are stored according to the groups. A computer program or database system executes queries that include multiple alternative equality conditions between a database column and a set of values. The database system also includes an optimizer that is configured to apply a function to each value to obtain a result for each value. The values are organized into groups where each group includes values with the same result. The values are stored according to the groups.

12 Claims, 6 Drawing Sheets

METHOD AND SYSTEM FOR ORGANIZING VALUES OF ALTERNATIVE EQUALITY CONDITIONS

BACKGROUND

Query optimization is important in relational database systems that deal with complex queries against large volumes of data. Unlike earlier navigational databases, a query on a relational database specifies what data is to be retrieved from the database but not how to retrieve it. Optimizing a query against a relational database is not as important in transaction-oriented databases where only a few rows are accessed either because the query is well specified by virtue of the application or because the query causes the data to be accessed using a highly selective index. In decision support and data mining applications, where the space of possible solutions is large and the penalty for selecting a bad query is high, optimizing a query to reduce overall resource utilization can provide orders of magnitude of overall performance improvement.

One existing query optimization technique is to rewrite the user-specified query. The query is transformed into a logically equivalent query that costs less, i.e. requires less time, to execute. The existing techniques for query transformation include syntactic and semantic techniques. Syntactic or algebraic transformations use the properties of the query operators and their mapping to rewrite the query. Some forms of magic set transformation, most forms of predicate push down, and transitive closures are techniques that fall under this category. Semantic query transformations use declarative structural constraints and the semantics of an application's specific knowledge, declared as part of the database, to rewrite the query. Semantic query transformation based rewrites are called semantic query optimization or SQO.

SUMMARY

In general, in one aspect, the invention features a method for organizing values for multiple alternative equality conditions between a database column and a set of those values. The method includes applying a function to each value to obtain a result for each value. The values are organized into groups where each group includes values with the same result. The values are stored according to the groups.

Implementations of the invention may include one or more of the following. A table is built that includes linked lists in each of which the values have the same function result. The number of values in the set is compared against a predetermined number of values. The multiple alternative equality conditions are evaluated by at least comparing the result of applying the function to values in the database column with the function results for the set of values.

In general, in another aspect, the invention features a computer program for executing database queries that include multiple alternative equality conditions between a database column and a set of values. The program includes executable instruction that cause a computer to apply a function to each value to obtain a result for each value. The values are organized into groups where each group includes values with the same result. The values are stored according to the groups.

In general, in another aspect, the invention features a database system for executing database queries that include multiple alternative equality conditions between a database column and a set of values. The database system includes one or more nodes; a plurality of CPUs, each of the one or more nodes providing access to one or more CPUs; and a plurality of virtual processes, each of the one or more CPUs providing access to one or more virtual processes, each virtual process configured to manage data, including rows organized in tables, stored in one of a plurality of data-storage facilities. The database system also includes an optimizer that is configured to apply a function to each value to obtain a result for each value. The optimizer organizes the values into groups where each group includes values with the same result. The values are stored according to the groups.

DETAILED DESCRIPTION

Figure 1:
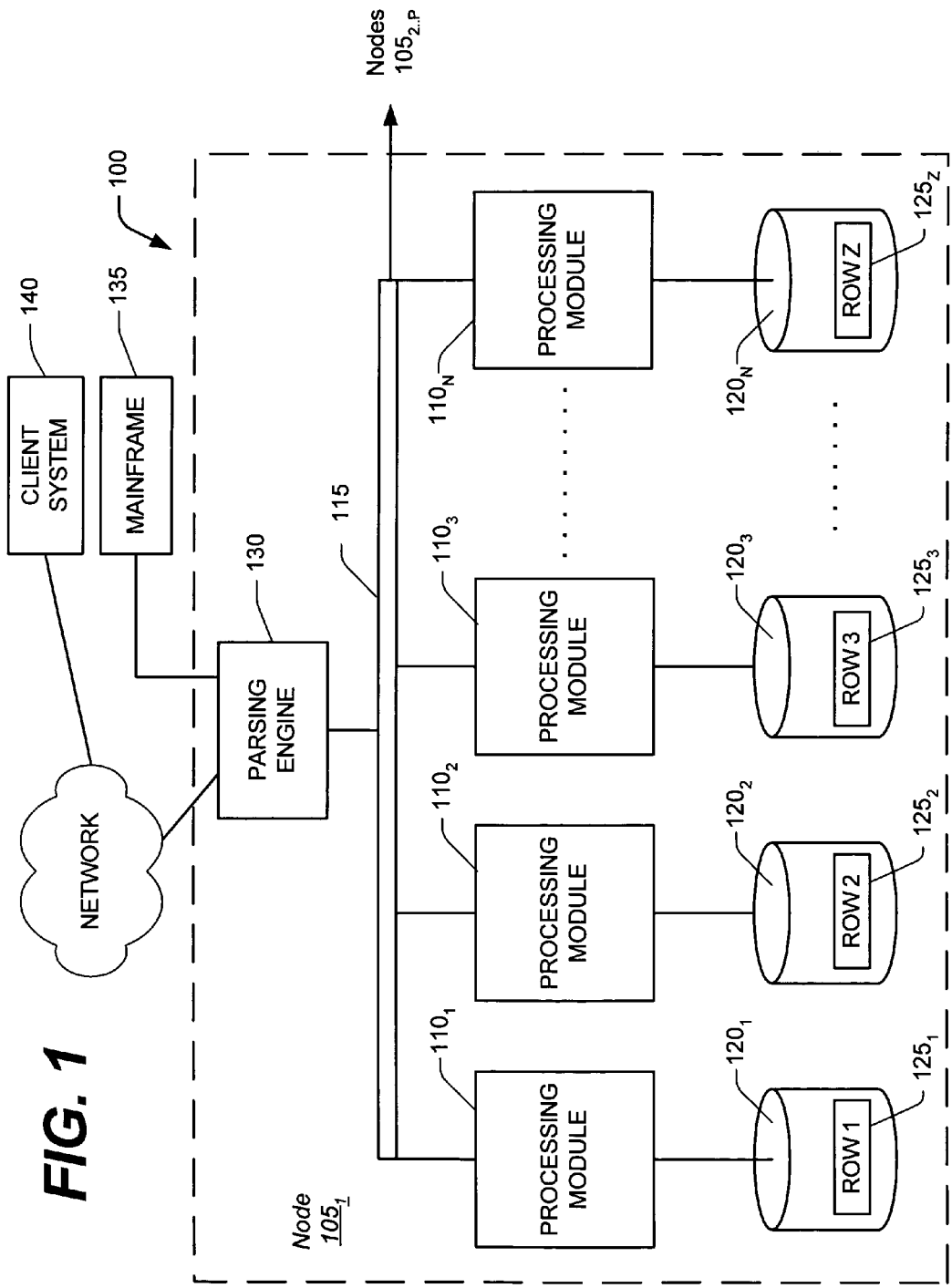
FIG. 1 is a block diagram of a node of a parallel processing database system.

The query optimization technique disclosed herein has particular application, but is not limited, to large databases that might contain many millions or billions of records managed by the database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...P}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
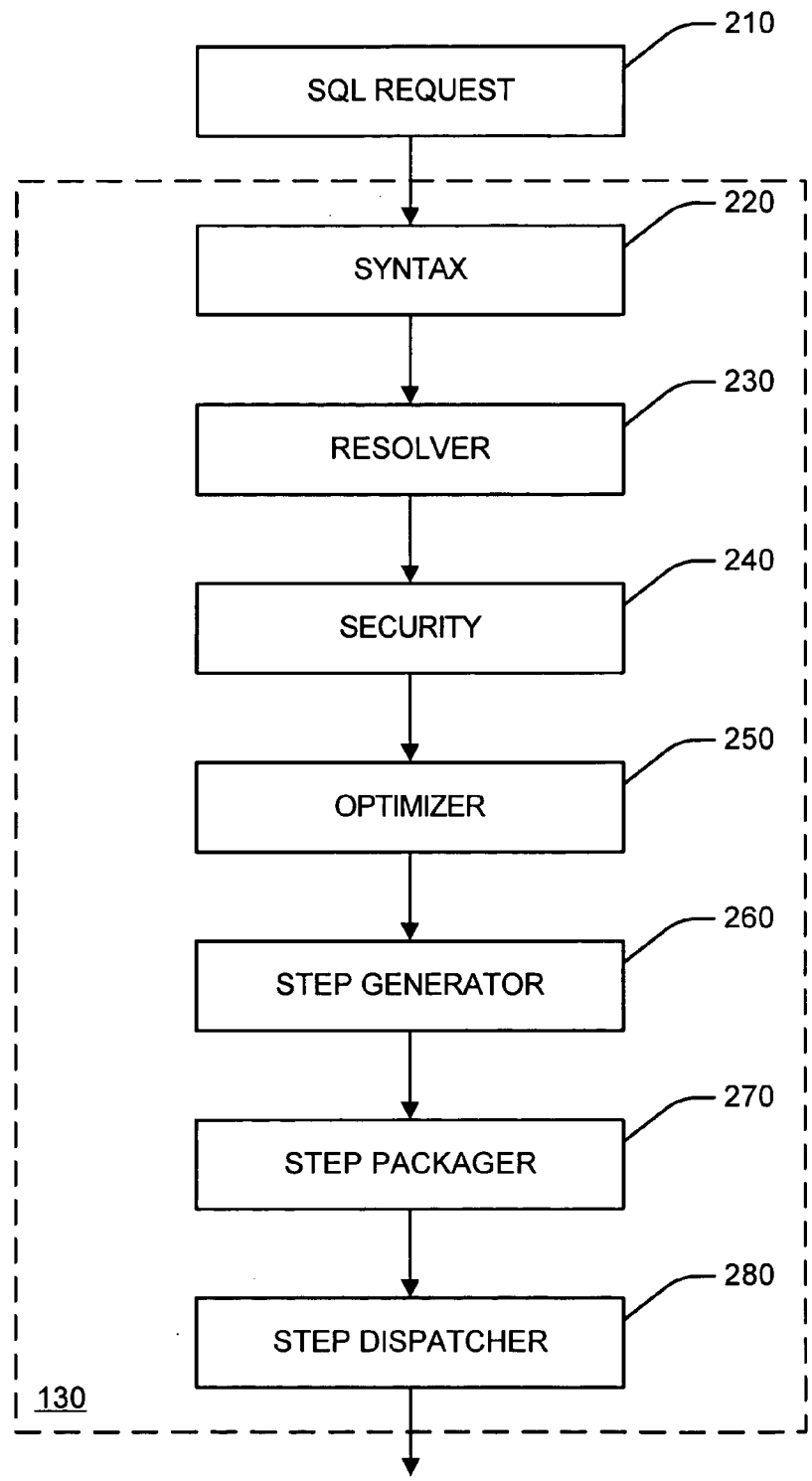
FIG. 2 is a block diagram of a parsing engine.

FIG. 2 is a block diagram of the parsing engine 130. An SQL request 210 is submitted to the parsing engine 130 and is initially checked for syntax 220. The resolver 230 then checks for and reports semantic errors and determines additional conditions based on transitivity. If one condition requires that the price is $10 and another requires that the cost is half the price, a third condition can be determined by transitivity: the cost is $5. The new conditions can be redundant with the original conditions, but can result in faster execution. For example, it is possible for a query to run more quickly with conditions of price=$10 and cost=$5 than with conditions of price=$10 and cost=50% (price).

Once the query has been processed by the resolver 230, it is passed to the security component 240 of the parsing engine 130. The security component 240 checks the security level of the database user who initiated the query. The security component 240 also checks the security level of the information sought by the request. If the user's security level is less than the security level of the information sought, then the query is not executed.

Once the query passes security it is analyzed by the optimizer 250. The optimizer 250 determines possible series of steps for executing the query. The optimizer 250 also estimates the costs associated with each series of steps. The cost associated with a series of steps is related to the amount of data encompassed by each condition corresponding to a step in the series. The execution of a query involves temporary results and sub-query results and the amount of data in those results is one factor in determining the costs of executing the query. A temporary result that requires a large amount of system resources to generate has high cost.

After estimating the costs associated with potential query execution plans, the optimizer 250 chooses the plan that has the lowest estimated cost. The more accurate the estimates of cost for particular execution plans, the more likely the optimizer 250 is to choose the correct plan. The optimizer 250 can access statistics describing the information stored in the database to help estimate the cost of conditions and temporary results corresponding to steps in query execution plans.

The plan chosen by the optimizer 250 is passed to the step generator 260. The steps are then sent to the step packager 270 and dispatched from the step dispatcher 280. If the plan chosen is not the optimal plan, the steps generated will require the use of more resources than the steps that would be generated by another plan that yields the same output. In a parallel database system servicing thousands of concurrent users, an increase in the resources employed for each query can result in longer wait times for every user.

Figure 3:
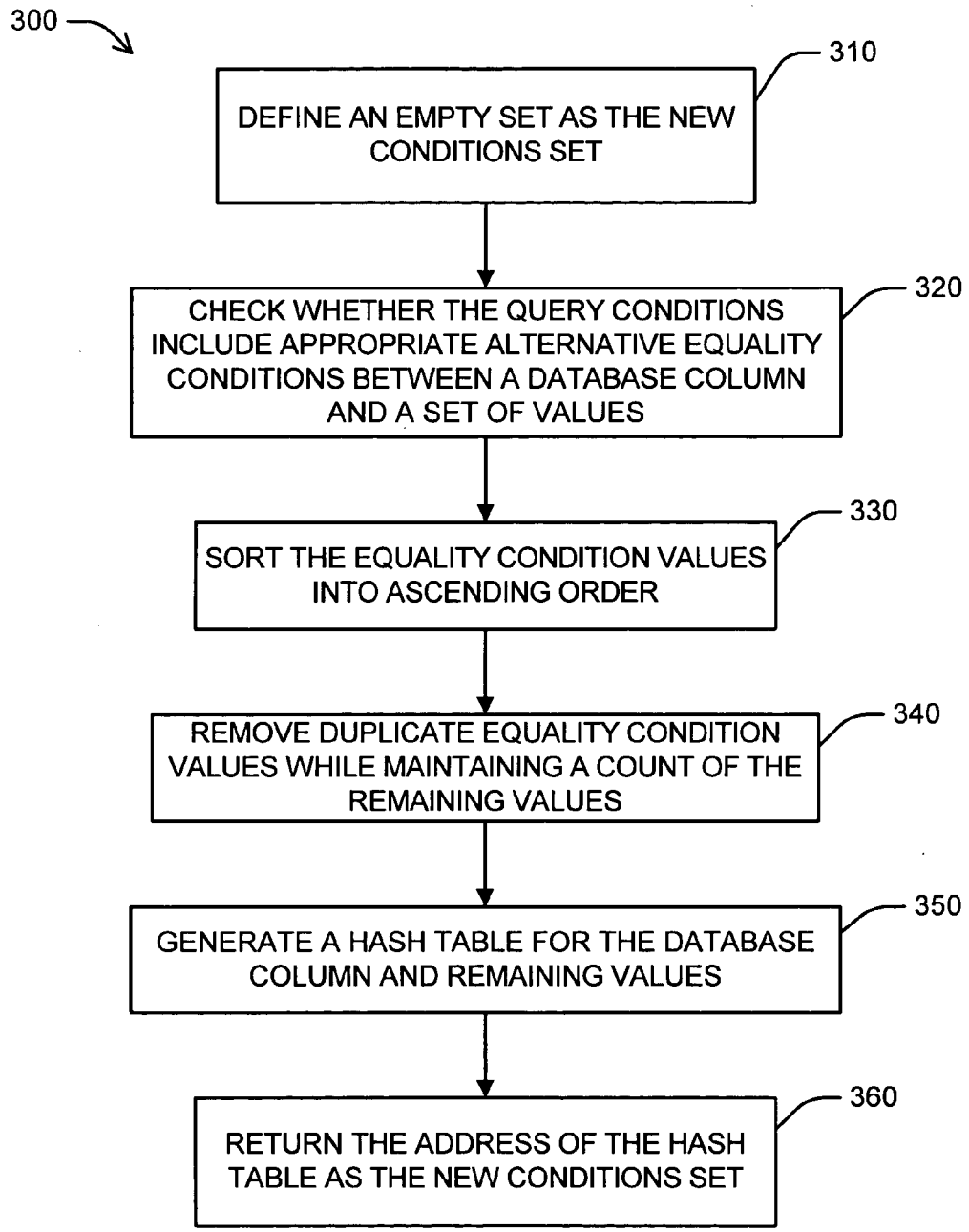
FIG. 3 is a flow chart of one method for organizing values of multiple alternative equality conditions in a query.

FIG. 3 is a flow chart of one method 300 for organizing values of multiple alternative equality conditions in a query. First, a new conditions set is defined as an empty set 310. The query is checked for whether there are appropriate alternative equality conditions between a database column and a set of values 320. The logical characterization of alternative equality conditions is equality condition linked with an 'or' operator. For example, if a database request asks for all products for which the price is $9.99 or the price is $19.99, then the two price conditions are alternative equality conditions. If the check is successful, then the equality condition values are sorted into ascending order 330. Duplicate values are removed from the set of values 340. The remaining values are organized and stored in a hash table along with the database column 350. The address of the hash table is returned in the new conditions set 360. An example of one computer program for implementing the method is disclosed below. The Prepare function and Install procedure are discussed in more detail below with example computer programs. In the following procedure, C represents the group of alternative equality conditions between a database column and a set of values. The procedure outputs NewC, which contains the address for the new condition in the form of a hash table.

Figure 4:
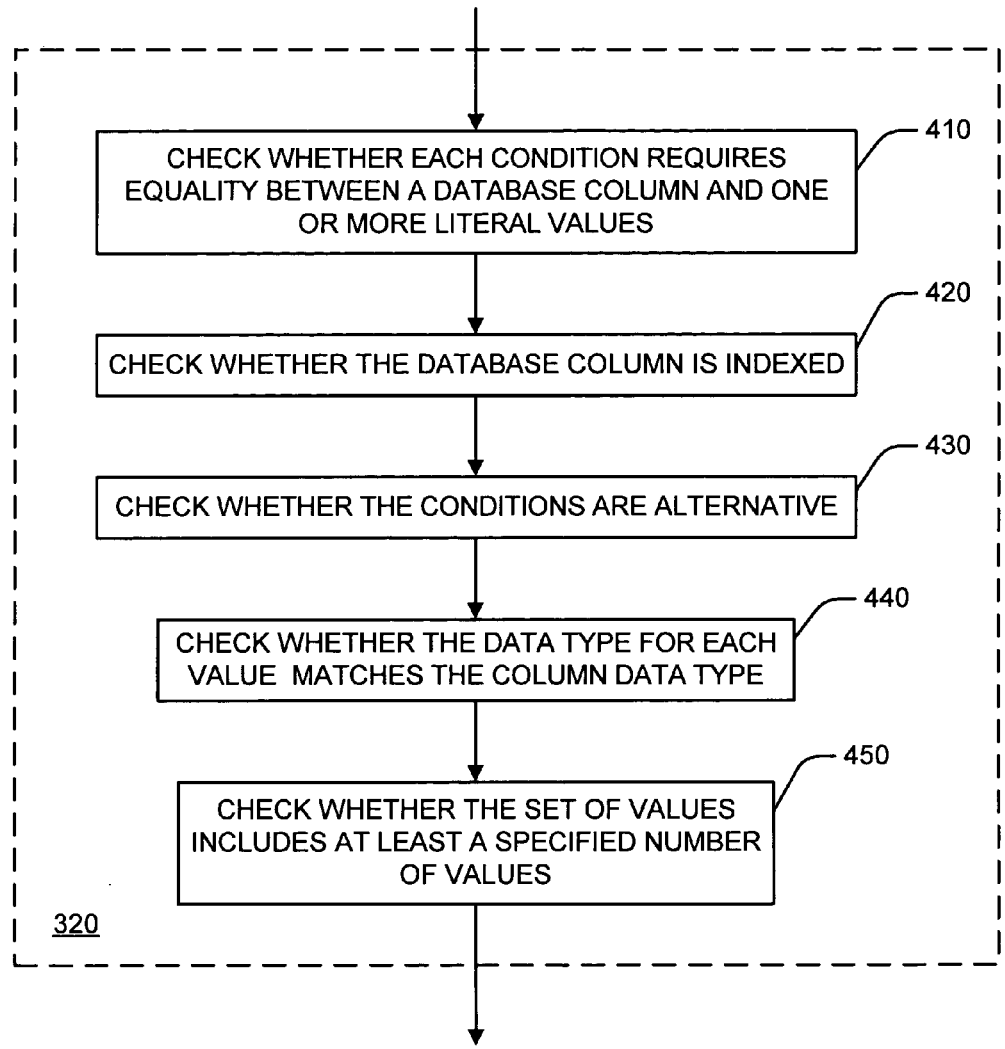
FIG. 4 is a flow chart of one method of checking the query conditions.

PROCEDURE CreateParHashLookup (IN C, OUT NewC):
BEGIN
   1. NewC<=[ ];
   2. If not Prepare(C,V,NV,X) then
     a. Return;
   3. Sort the values within V in ascending order;
   4. Eliminate duplicate values within V adjusting NV when necessary
   5. Call Install(V, NV, X, PHL);
END;

FIG. 4 is a flow chart of one method 320 of checking the query conditions. First, the conditions are checked for equality operators linking a database column to literal values 410. If the column is indexed, the method can be aborted 420. In another embodiment, the method is used on indexed columns. The conditions are checked to see if they are alternative, e.g., logically connected by an 'or' operator 430. Alternative conditions can also be represented as an in list in the form: X in (l1, l2, l3 ... l10). The data type or value format of the column and the set of values is checked for consistency 440. The number of values in the set is checked against a minimum number of values 450. The minimum number of values can be statistically calculated to reflect a greater than 50% chance that the execution time savings of running a comparison based on the organized values for a certain number of alternative equality conditions is greater than the cost of carrying out the storage of the values according to a function result based organization. An example of one computer program for implementing the method of checking the query conditions is disclosed below. In the following function, C represents the group of alternative equality conditions between a database column and a set of values. The procedure outputs V, N, and X, where V is intended to represent an array containing the set of values for which C contains alternative equality conditions with a database column, N is intended to represent the number of values in the array, and X identifies the column.

Figure 5:
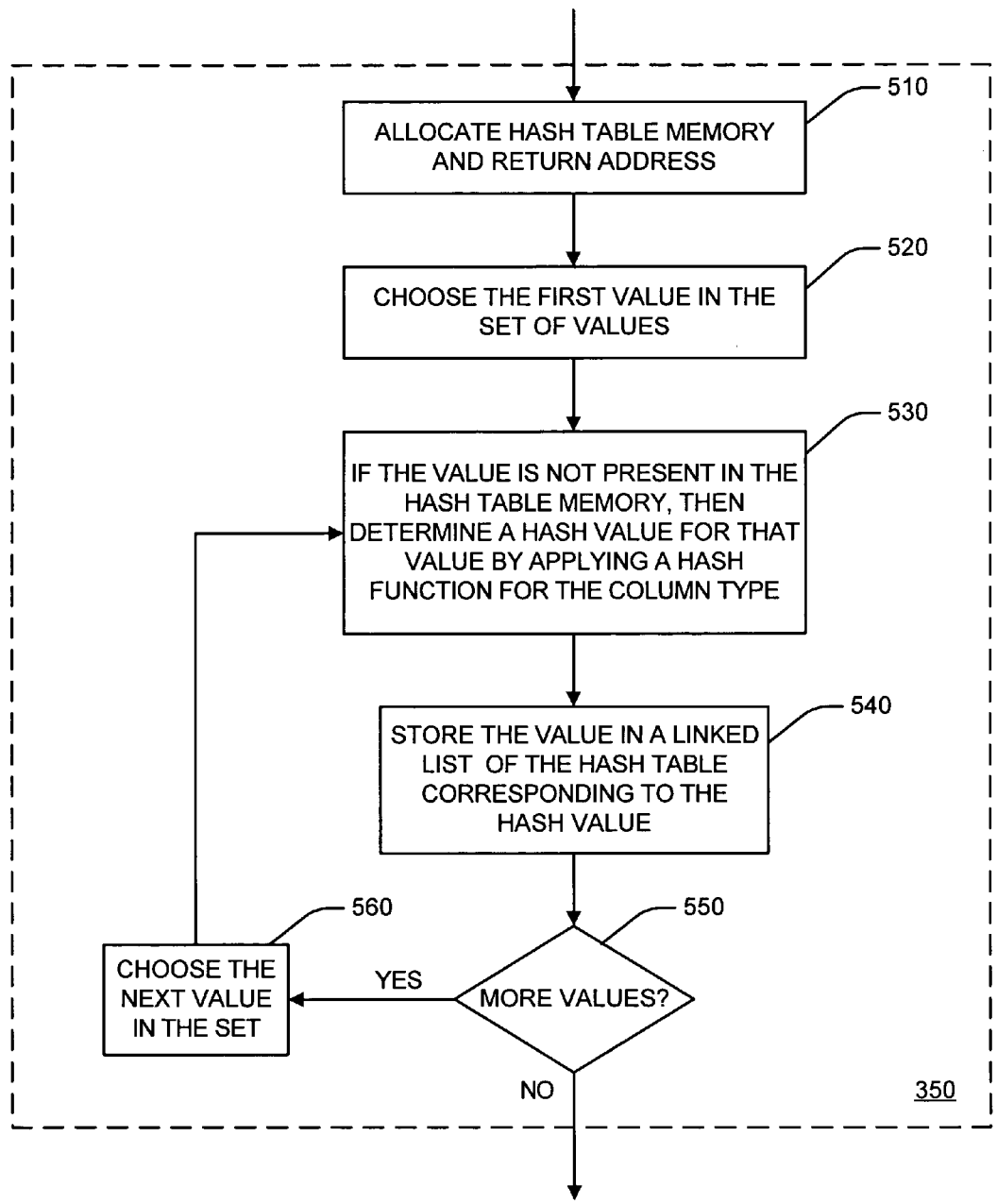
FIG. 5 is a flow chart of one method of generating a data structure containing the values organized according to function result.

FUNCTION Prepare(IN C; OUT V, N, X):
BEGIN
   1. N<=0;
   2. V<=[ ];
   3. X<=NIL;
   4. For each term t in C do
     a. If t is not of the form X=literal values then
       i. Return false;
     b. If X=NIL
       i. X<=extract Column from t;
       ii. If X is an index then
          1. Return false;
     c. Else If X not equal extract X from t then i. Return false;
 d. If the logical operator is not OR then
  i. Return false;
 e. v<=extract the literal value from t;
  i. If the data type of v is not the same of X then
  ii. Convert the value of v to the type of X;
 f. Increment N by 1;
 g. V[N]<=V;
 5. If N is less than Tn then
  a. Return false;
 6. Return true;
END;

FIG. 5 is a flow chart of one method of generating a data structure containing the values organized according to function result 350. First, hash table memory is allocated and the address of that allocated memory is returned 510. The first value in the set of values is selected 520. If the values is not present in the current hash table, then a hash function for the column data type is applied to the value to determine a hash value 530. The value is stored as the next entry in a linked list of the hash table corresponding to its hash value 540. The set is checked for values that have not been selected 550. If some remain, the next value is selected 560. If no values remain, the data structure has been successfully generated. In one embodiment, separate tables including linked lists are generated for each data type for which there are multiple alternative equality conditions in a query. In one implementation, once the values are stored in linked lists, a comparison with a column can be limited to comparing each value in the column only to the values in the linked list corresponding to the hash value. Organizing the values according to function results can reduce the storage requirements and the computation time for evaluating multiple equality conditions. An example of a procedure for generating a data structure containing the values organized according to function result is disclosed below including two functions called by the procedure. In the following procedure V is intended to represent an array containing the set of values for which there are alternative equality conditions with a column, N is intended to represent the number of values in the array, and X identifies the column. The output of the program is PHL, the address of the hash tablelookup node as an alternative representation of the original multiple equality conditions.

Figure 6:
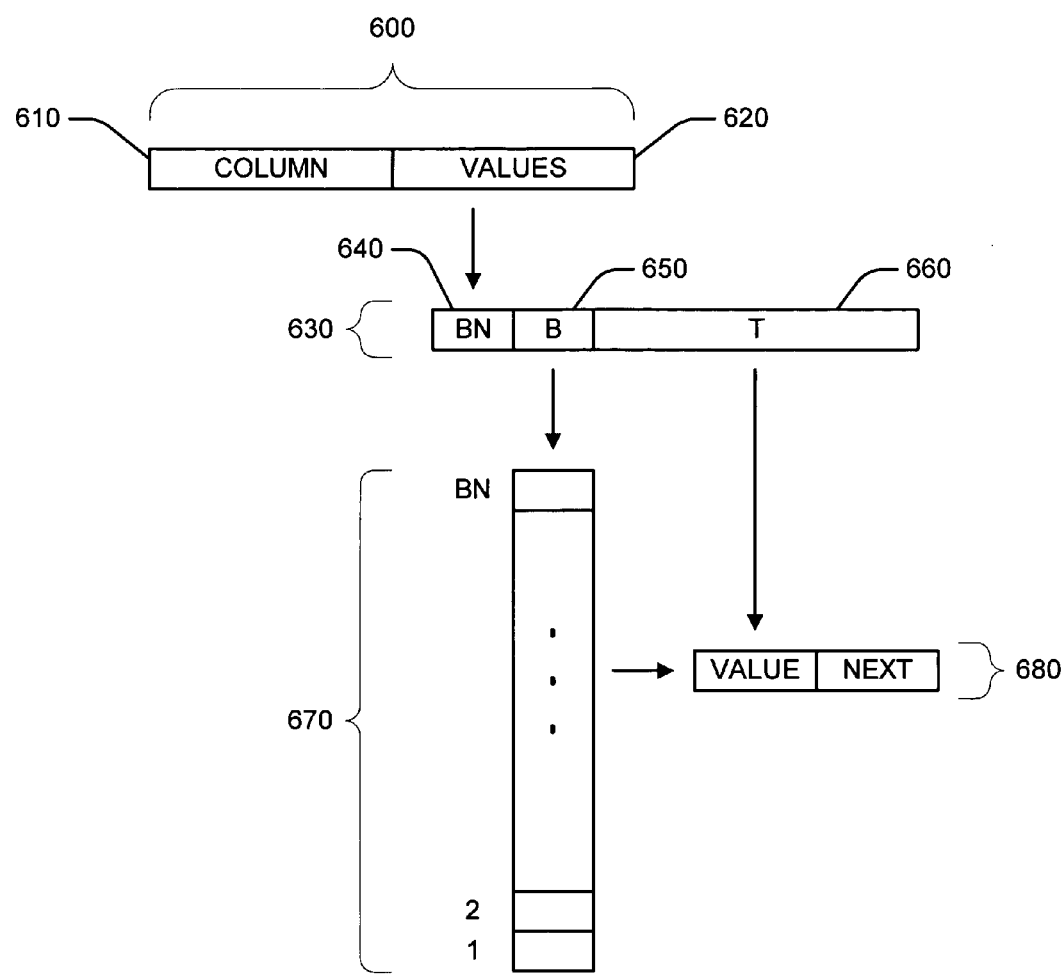
FIG. 6 is a diagram of a data structure for storing the values.

PROCEDURE Install (IN V, N, X, OUT PHL):
BEGIN
 1. NewC<=newnode(ParHashLookup);
 2. PHL→FieldRefPtr<=X;
 3. HT<=CreateNewHashTable(N,X);
 4. PHL→HashTablePtr<=HT;
 5. NV<=0; —The current number of values stored within the hash table;
 6. For i in 1 . . . N do
  a. If Lookup(V[i],HT,HVal,Type of X) then
   i. P<=HT+size of integer+(HT→BN*size of pointer)+NV*(size of type X+size of pointer);
   ii. Increment NV by 1;
   iii. P→Value<=V[i];
   iv. P→Next<=value of location pointed to by HT+size of integer+(HVal*size of pointer);
   v. value of location pointed to by (HT+size of integer+(HVal*size of pointer))<=P;
END;

FUNCTION CreateNewHashTable (IN N, X):
BEGIN
 1. BN<=find the first prime number to the right of N/4;
 2. BlockLength<=size of integer+size of pointer*BN+(size of type X+size of pointer)*N;
 3. HT<=new block of memory with length BlockLength;
 4. HT→BN<=BN;
 5. P<=HT+size of integer;
 6. For i in 0 BN−1 do
  a. Store NIL into area pointed to by P+i;
 7. Return HT;
END;

FUNCTION Lookup(IN LV, HT, XType, OUT HVal):
BEGIN
 1. HVal<=hash value of LV using system hash function for type XType;
 2. HVal<=remainder of HVal divided by HT→BN;
 3. P<=value of location pointed to by (HT+size of integer+(HVal*size of pointer));
 4. While P not equal NIL do
  a. If P→Value equal LV then
   i. Return false;
  b. Else
   i. P<=P→Next;
 5. Return True;
END;

FIG. 6 is a diagram of a data structure for storing the values. In one embodiment, the entire data structure 600 is identified as ParHashLookup. It includes two subparts: the address of the column that is an element of the multiple alternative equality conditions 610 and an address for the ParHashTable that stores the linked lists of values organized according to hash function result 620. The ParHashTable 630 includes the number of linked lists 640, an array of hash values 650, and a table of linked lists 660 each corresponding to one of the hash values. The number of linked lists is a value that can be referred to as the bucket length or BN. The array of hash values 670 has a length of BN and each element of the array points to the first member of the linked list whose values have that hash value, e.g., 680. For each value beyond the first corresponding to the hash value, there is an address, identified as NEXT, included with the current value 680. For example, if three values in the set have the same hash value, the array 670 would include the hash value and the address where the first value and the address of the second value are stored. The address of the third value is stored with the second value. In this implementation, each value sharing a hash function result is linked to the next by an address.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-based method for organizing values of multiple alternative equality conditions between a database column and a set of the values of the multiple alternative equality conditions comprising:
 applying a function to each value of the multiple alternative equality conditions to obtain a result for each value, wherein the multiple alternative equality conditions include less than all multiple alternative equality conditions corresponding to a database query;
 organizing the values into groups where each group includes values with the same result; and
 storing the values according to the groups.

2. The method of claim 1 where storing values according to the group comprises linking values with pointers to values in the same group.

3. The method of claim 1 further comprising the step of:
evaluating the multiple alternative equality conditions, including at least comparing the result of applying the function to values in the database column to the function results for the set of values.

4. The method of claim 1 further comprising the step of:
checking whether the set contains more values than a predetermined number.

5. A computer program, stored on a tangible storage medium, for executing database queries that include values of multiple alternative equality conditions between a database column and a set of the values of the multiple alternative equality conditions, the program comprising executable instructions that cause a computer to:
apply a function to each value of the multiple alternative conditions to obtain a result for each value, wherein the multiple alternative equality conditions include less than all multiple alternative equality conditions corresponding to a database query;
organize the values into groups where each group includes values with the same result; and
store the values according to the groups.

6. The computer program of claim 5 where the values are stored according to the groups by linking values with pointers to values in the same group.

7. The computer program of claim 5 further comprising executable instructions that cause a computer to:
evaluate the multiple alternative equality conditions by at least comparing the result of applying the function to values in the database column to the function results for the set of values.

8. The computer program of claim 5 further comprising executable instructions that cause a computer to:
check whether the set contains more values than a predetermined number.

9. A database system for executing database queries that include values of multiple alternative equality conditions between a database column and a set of the values of the multiple alternative equality conditions, comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data, including rows organized in tables, stored in one of a plurality of data-storage facilities; and
an optimizer configured to:
apply a function to each value of the multiple alternative equality conditions to obtain a result for each value, wherein the multiple alternative equality conditions include less than all multiple alternative equality conditions corresponding to a database query;
organize the values into groups where each group includes values with the same result; and
store the values according to the groups.

10. The database system of claim 9 where the values are stored according to the groups by linking values with pointers to values in the same group.

11. The database system of claim 9 where the optimizer is further configured to:
evaluate the multiple alternative equality conditions by at least comparing the result of applying the function to values in the database column to the function results for the set of values.

12. The database system of claim 9 where the optimizer is further configured to:
check whether the set contains more values than a predetermined number.

* * * * *